Figure 1:
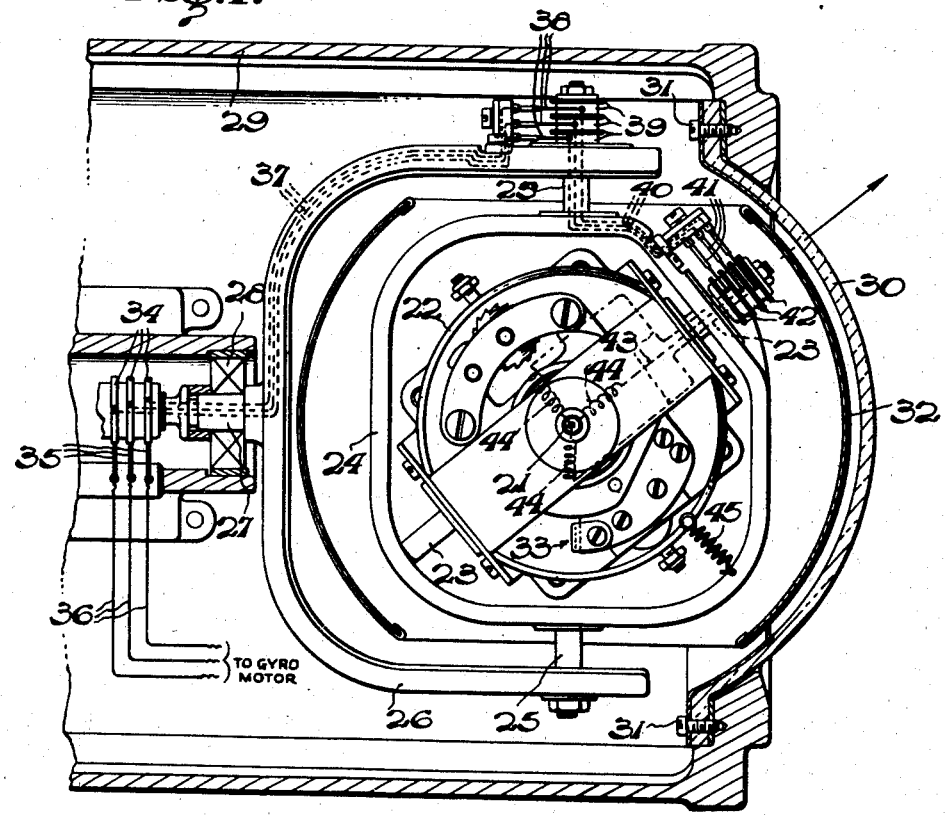

April 6, 1948.  R. L. DIVOLL  2,439,358
ATTITUDE GYRO
Filed July 3, 1945

Inventor
Richard L. Divoll
By C. J. Talman
ATTORNEY

Patented Apr. 6, 1948

2,439,358

UNITED STATES PATENT OFFICE 2,439,358

ATTITUDE GYRO

Richard L. Divoll, Concord, Mass., assignor to Bendix Aviation Corporation, Teterboro, N. J., a corporation of Delaware Application July 3, 1945, Serial No. 603,047

6 Claims. (Cl. 74—5)

The present invention relates generally to gyroscopic devices of a non-tumbling character and more particularly constitutes a novel improvement over the non-tumbling, free gyroscope of copending application Serial No. 569,748, filed December 26, 1944.

By the invention of the above-referred to copending application, a non-tumbling gyroscope is provided comprising a conventional three-degree-of-freedom gyro having its spin axis vertical and arranged with its minor gimbal trunnions fore and aft and its major gimbal trunnions athwartwise together with an outer yoke having a trunnion pivotally mounting the yoke about a fore and aft axis so that in effect the yoke trunnion becomes the gyro major trunnion while the major gimbal trunnions become the minor trunnions, and the minor gimbal trunnions become the minor-minor trunnions. Yieldable means, moreover, are provided between the gimbal and the rotor casing for constraining motion of the rotor relative to the gimbal so that a normal relation is maintained between the rotor spin axis and the athwartship axis of oscillation so that the spin axis can never align with the athwartship axis of oscillation which condition, if permitted, would cause the gyro to precess and tumble in response to a vertical pitch condition.

During a loop, the gyroscope of the above arrangement will attain a condition wherein the major trunnion momentarily lines up with the rotor spin axis causing the gyro to precess a limited amount sufficient to pass the spin axis out of alignment with the axis of the major trunnion while the major portion of the precessive torque acts through the yieldable constraint to re-orient the minor trunnions of the gimbal to become normal to the rotor spin axis. It is desirable, however, to limit the amount of precession required for the above-stated purpose to a minimum and the attainment of this end is provided by the present invention.

An object of the present invention, therefore, is to provide a novel and improved non-tumbling, free gyroscope.

Another object of the invention is to provide a novel and improved non-tumbling, free gyroscope of the above character in which the minor-minor trunnions are arranged at some angular relation other than normal with the minor trunnions so that any uncertainty as to the direction of rotation of the supporting yoke about the major axis for small departures of the craft from a vertical loop is minimized whereby gyro precession resulting from momentary alignment of the spin axis with the major axis is brought to a minimum.

Other and further objects and advantages of the invention will appear more fully hereinafter from a consideration of the detailed description which follows, taken together with the accompanying drawings. It is to be expressly understood, however, that the drawing is for the purpose of illustration only and is not designed as a definition of the limits of the invention.

Figure 2:
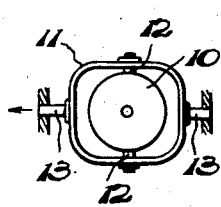
Figure 3:
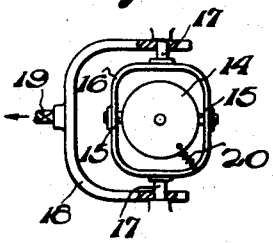
Figure 4:
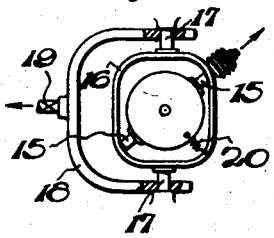

In the drawings, wherein like reference characters refer to like parts throughout the several views, Figure 1 is a top elevation view partly in section and partly diagrammatic of the novel non-tumbling, free gyroscope of the present invention; and Figures 2 to 4, inclusive, are illustrative views showing the difference between a conventional artificial horizon gyroscope, the non-tumbling gyro of the above-referred to copending application and the non-tumbling gyro hereof.

A conventional artificial horizon gyroscope generally comprises a rotor provided with a normally vertical spin axis mounted within a rotor casing 10, as shown in Figure 2, the casing being mounted for oscillation within a gimbal 11 about a first normally horizontal axis by way of minor trunnions 12, the gimbal, in turn, being mounted for oscillation about a second normally horizontal axis perpendicular to the first horizontal axis, the first axis of oscillation being defined by trunnions 12 which are normally arranged transversely with respect to a craft and the second axis of oscillation being defined by trunnions 13 which are arranged parallel with the fore and aft craft axis. The inner trunnions are, therefore, referred to as the pitch axis and the outer trunnions as the bank axis.

For normal flight conditions, the conventional gyro reliably serves its function in indicating pitch and bank. In acrobatic flying, however, it becomes unreliable and must be centralized and locked to prevent damage thereto. For example, in a vertical climb or dive the outer trunnions 13 will align with the rotor spin axis thereby effectively destroying one of the gyro axes of freedom. Thereafter, the introduction of any bank component will cause the gyro to precess violently, this condition being known as "tumbling."

A non-tumbling gyro has been provided by the above-referred to copending application which comprises generally, as shown in Figure 3, a rotor provided with normally vertical spin axis mounted within a casing 14 which is supported by way of minor-minor trunnions 15 within an intermediate gimbal 16, the latter being mounted by way of minor trunnions 17 within an outer yoke or gimbal 18 which is supported for oscillation within a suitable fixed casing (not shown) by way of major trunnion 19. Major trunnion 19 and minor-minor trunnions 15 are arranged parallel with the craft's fore and aft axis while minor trunnions 17 are arranged parallel with the craft's transverse axis. By providing a spring 20 between the rotor casing and the inner gimbal, the minor trunnions are kept normal with the rotor spin axis so that the gyro is free about all of its axes. In vertical pitch, for example, when the major axis aligns with the spin axis, any motion in bank on the part of the craft will manifest itself in a precession of the gyro to urge the spin axis from out of alignment with the major axis.

It has been discovered by the present invention, that the amount of precession required to return the rotor spin axis out of alignment with the major axis may be desirably limited to a minimum by displacing the minor-minor trunnions to a relation other than normal to the minor axis as shown in Figure 4. This desirable end being accomplished by reason of the fact that by displacing the minor-minor axis relative to the minor axis in the manner shown, any uncertainty is minimized as to the direction of rotation of yoke or gimbal 18 for small departures of the craft from the vertical plane during a loop.

Referring now to Figure 1 of the drawing for a more detailed description, the novel and improved non-tumbling gyroscope constituting the subject matter of the present invention comprises a rotor (not shown) provided with a normally vertical spin axis 21 mounted within a rotor casing 22. The casing, in turn, is supported by way of minor-minor trunnions 23 within an intermediate gimbal 24 which is supported by way of minor trunnions 25 within a yoke or outer gimbal 26, the latter being supported by way of a major trunnion 27 within a bearing 28 secured within an instrument casing 29. In accordance with the novel feature of the present invention, the minor-minor trunnions are not arranged fore and aft as heretofore but are arranged at some angle other than normal relative to the minor axis.

The open end of the casing 29 is closed by way of a suitable cover glass 30 which is fastened to the interior of the casing by means such as screws 31, for example. An indicating member 32 in substantially the form of a sphere is secured to the rotor casing to enclose the intermediate gimbal 24 for relative up and down and lateral motion with respect to the front of the instrument where a fixed reference (not shown) is provided intermediate the sphere 32 and the cover glass. The specific indicating provision may be of the type shown and described in the aforementioned copending application. Moreover, in order to overcome spin axis deviation from its normally vertical position due to bearing friction, acceleration, etc., an erecting mechanism, generally designated with the reference character 33, comprising a rolling ball and escapement mechanism, is provided. The erection system shown is of the type described and claimed in U. S. Patent No. 2,159,118 issued May 23, 1939.

The gyro rotor, though it may be driven pneumatically, is shown as being driven electrically and, for this purpose, major trunnion 27 may be provided with a group of three slip rings 34 engaged by brushes 35 connected by way of conductors 36 with a suitable source of energizing current (not shown). Slip rings 34 connect by way of conductors 37, passing through trunnion 27 and yoke 26, with brushes 38 which engage slip rings 39, the latter being connected through conductors 40, passing through one of trunnions 25 and gimbal 24, with brushes 41 which engage slip rings 42, these being connected through conductors 43 with the windings 44 of the gyro motor.

In order to prevent tumbling, means are provided whereby the rotor spin axis will be maintained out of alignment with minor trunnions 25 so that notwithstanding varying craft maneuvers the gyroscope will possess its three axes of freedom at all times, such means comprising a resiliant spring 45 anchored at one end to rotor casing 22 and to inner gimbal 24 at its other end. By reason of spring 45, rotor freedom about one of the axes of oscillation, i. e., minor trunnions 25 are yieldably constrained and relative motion between rotor casing 22 and inner gimbal 24 prevented so that minor trunnions 25 can never align with the rotor spin axis. Moreover, when the axis of major trunnion 27 aligns with the rotor spin axis during vertical climb or dive and a bank component is introduced the gyroscope will precess a limited amount only, sufficient to remove the spin axis out of alignment with the axis of the major trunnion while the major part of the precessive torque works through spring 45 to reorient minor trunnions 25 of gimbal 24 to become perpendicular with the rotor spin axis, the amount of precession being limited to a minimum by the novel angular disposition of minor-minor trunnions 23 relative to minor trunnions 25.

In the foregoing manner, the novel gyroscope of the present invention retains all of its axes of freedom at all times to thereby accurately respond throughout 360° of bank and pitch and/or any combination thereof.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art. For a definition of the limits of the invention, reference will be had primarily to the appended claims.

What is claimed is:

1. A navigational instrument for aircraft comprising a housing, a gyroscopic device within said housing comprising a rotor adapted for spinning about a normally vertical axis, a gimbal for supporting said rotor for oscillation about a first horizontal axis arranged at an angle to the fore and aft craft axis and about a second horizontal axis parallel with the craft transverse axis, means rotatably mounted within said housing for supporting said gimbal for oscillation about a third horizontal axis aligned with the craft's fore and aft axis, all of said axes of oscillation being contained in a common and normally horizontal plane, and resilient means for maintaining a predetermined relation between said gimbal and said rotor.

2. In a gyroscopic device comprising a rotor adapted for spinning about one axis, means comprising a gimbal for mounting said rotor for oscillation about two non-perpendicular axes other than said spin axis, means pivotally mounted about a third axis perpendicular to one of said last-named two axes for supporting said gimbal, said last-named three axes being contained in a common plane, and means constraining motion of said rotor relative to said gimbal.

3. In a gyroscopic device comprising a rotor adapted for spinning about a normally vertical axis, means comprising a gimbal for mounting said rotor for oscillation about two horizontal axes, one of said two axes being displaced less than 90° relative to the other, means pivotally mounted about a third horizontal axis perpendicular to one of said first-named two horizontal axes for supporting said gimbal, said last-named three axes being contained in a common and normally horizontal plane, and means constraining motion of said rotor relative to said gimbal.

4. A non-tumbling artificial horizon gyroscope comprising a rotor provided with a normally vertical spin axis, a casing for said rotor, a gimbal for mounting said casing for oscillation about two horizontal axes one of which is displaced less than 90° relative to the other, a second gimbal pivotally mounted about a third horizontal axis perpendicular to one of said first-named two horizontal axes for supporting said first gimbal, said last-named three axes being contained in a common and normally horizontal plane, and means constraining motion of said casing relative to said first gimbal.

5. A navigational instrument for aircraft comprising a housing, a gyroscopic device within said housing comprising a rotor adapted for spinning about a normally vertical axis, a casing for said rotor, a gimbal for supporting said casing for oscillation about a first horizontal axis arranged at an angle to the fore and aft craft axis and about a second horizontal axis parallel with the craft transverse axis, means comprising a yoke member rotatably mounted within said housing for supporting said gimbal for oscillation about a third horizontal axis aligned with the craft's fore and aft axis, all of said axes of oscillation being contained in a common and normally horizontal plane, and resilient means connecting said rotor casing with said gimbal.

6. In a gyroscopic device comprising a rotor adapted for spinning about one axis, a casing for said rotor, means comprising a gimbal for mounting said casing for oscillation about two non-perpendicular axes other than said spin axis, means comprising a yoke member defining a second gimbal pivotally mounted about a third axis perpendicular to one of said last-named two axes for supporting said first gimbal, said last-named three axes being contained in a common plane, and yieldable means connecting said rotor casing with said first gimbal.

RICHARD L. DIVOLL.

REFERENCES CITED

The following references are of record in the file of this patent:

UNITED STATES PATENTS

| Number | Name | Date |
|---|---|---|
| 1,067,808 | Fuchs | July 22, 1913 |
| 1,495,911 | Lemoine | May 27, 1924 |
| 1,645,079 | Titterington | Oct. 11, 1927 |
| 2,199,256 | De Florez | Apr. 30, 1940 |
| 2,366,543 | Meredith | Jan. 2, 1945 |